(12) United States Patent
Janis et al.

(10) Patent No.: US 10,104,681 B2
(45) Date of Patent: Oct. 16, 2018

(54) TRANSMISSION COORDINATION IN WIRELESS NETWORK

(71) Applicant: Nokia Technologies Oy, Espoo (FI)

(72) Inventors: Pekka Janis, Espoo (FI); Jarkko Lauri Sakari Kneckt, Espoo (FI); Olli Alanen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 45 days.

(21) Appl. No.: 15/118,965

(22) PCT Filed: Feb. 13, 2014

(86) PCT No.: PCT/FI2014/050110
§ 371 (c)(1),
(2) Date: Aug. 15, 2016

(87) PCT Pub. No.: WO2015/121529
PCT Pub. Date: Aug. 20, 2015

(65) Prior Publication Data
US 2017/0055279 A1 Feb. 23, 2017

(51) Int. Cl.
*H04W 72/12* (2009.01)
*H04B 17/318* (2015.01)
*H04W 74/08* (2009.01)
*H04W 84/12* (2009.01)

(52) U.S. Cl.
CPC ...... *H04W 72/1231* (2013.01); *H04B 17/318* (2015.01); *H04W 72/12* (2013.01); *H04W 74/0816* (2013.01); *H04W 84/12* (2013.01)

(58) Field of Classification Search
CPC ......... H04W 72/1231; H04W 74/0816; H04W 72/12; H04W 84/12; H04B 17/318
See application file for complete search history.

(56) References Cited

U.S. PATENT DOCUMENTS

| 6,005,853 A | 12/1999 | Wang et al. | |
|---|---|---|---|
| 2009/0010241 A1* | 1/2009 | Uchida | H04W 28/22 370/345 |
| 2011/0128846 A1* | 6/2011 | Hong | H04W 28/18 370/230 |

(Continued)

FOREIGN PATENT DOCUMENTS

| WO | 2011153507 A2 | 12/2011 |
|---|---|---|
| WO | 2012134863 A1 | 10/2012 |

OTHER PUBLICATIONS

International Search Report of PCT/FI2014/050110, dated Oct. 28, 2014.

*Primary Examiner* — Shailendra Kumar
(74) *Attorney, Agent, or Firm* — Banner & Witcoff, Ltd.

(57) ABSTRACT

This document discloses a solution for enabling overlapping transmissions in a wireless network. An apparatus may be arranged to detect a response to a frame, the response transmitted from a first device as addressed to a second device different from the apparatus and comprising a first value indicating a received signal strength between the first device and the second device. The apparatus may determine a second value indicating a received signal strength of the response in the apparatus and cause transmission of a frame that overlaps with a transmission between the first device and the second device only if the second value in proportion to the first value is below a determined threshold.

20 Claims, 7 Drawing Sheets

(56) References Cited

U.S. PATENT DOCUMENTS

| | | | | |
|---|---|---|---|---|
| 2012/0250532 A1* | 10/2012 | Husted | .............. | H04W 74/0808 370/252 |
| 2013/0295921 A1* | 11/2013 | Bhargava | .............. | H04W 48/20 455/426.1 |
| 2014/0055302 A1* | 2/2014 | Jia | ............................ | H01Q 3/34 342/372 |

* cited by examiner

TRANSMISSION COORDINATION IN WIRELESS NETWORK

TECHNICAL FIELD

The invention relates to wireless networks and, particularly, to coordinating transmission in a wireless network.

BACKGROUND

In wireless networks, collision caused by overlapping transmissions may cause erroneous reception of frames. Collision avoidance mechanisms are sometimes used to reduce interference.

BRIEF DESCRIPTION

The invention is defined by the independent claims. Embodiments are defined in the dependent claims.

BRIEF DESCRIPTION OF THE DRAWINGS

In the following, the invention will be described in greater detail by means of preferred embodiments with reference to the accompanying drawings, in which.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
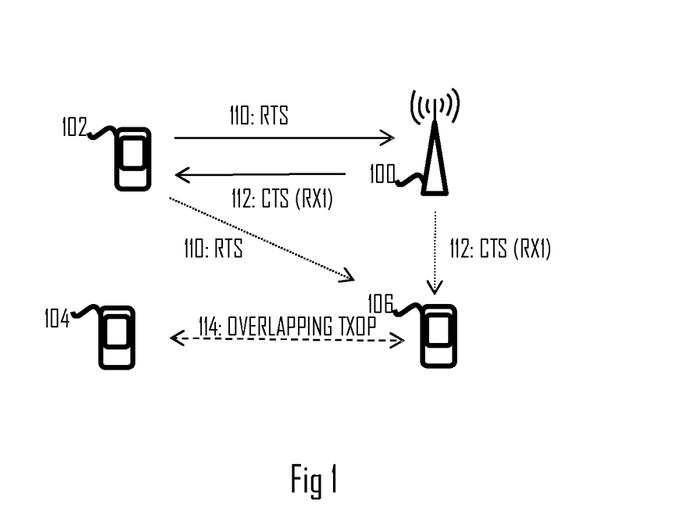
FIG. 1 illustrates a wireless communication scenario to which embodiments of the invention may be applied.

A general wireless communication scenario to which embodiments of the invention may be applied is illustrated in FIG. 1. FIG. 1 illustrates wireless communication devices comprising at least one access point (AP) 100, 106 and a plurality of terminal devices (STA) 102, 104, 106. The AP may be a stationary access point 100 or a mobile access point 106. A general term used in this specification and encompassing both the APs and STAs is a wireless device. The access point may refer to an access point specified in IEEE 802.11 specifications or to a base station of another wireless access network. At least one of the terminal devices 106 may have a functionality of an AP as well. Therefore, a common term encompassing both the stationary APs 100 and mobile APs 106 is an access node. An access node may provide or be comprised in a basic service set (BSS) which is a basic building block of an IEEE 802.11 wireless local area network (WLAN). Each access node may represent a different BSS. The most common BSS type is an infrastructure BSS that includes a single access node together with all STAs associated with the access node. The access node may provide access to other networks, e.g. the Internet. In another embodiment, the BSSs may be connected with each other by a distribution system (DS) to form an extended service set (ESS). An independent BSS (IBSS) is formed by an ad hoc network of terminal devices without a stationary controlling AP. In a context where two BSSs have overlapping coverage areas, one BSS may be considered as an overlapping BSS (OBSS) from the viewpoint of the other BSS. While embodiments of the invention are described in the context of the above-described topologies of IEEE 802.11, it should be appreciated that these or other embodiments of the invention may be applicable to wireless networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, the following description may be generalized to other systems as well.

The different access nodes may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless devices of the wireless network may carry out channel contention. The access node may define the RAW and a group of wireless devices that are allowed to attempt the channel access within the RAW. Grouping allows partitioning of the wireless devices into groups and restricting channel access only to wireless devices belonging to a specified group at any given time period. The time period may be enabled by allocating slot duration and a number of slots in RAW access. The grouping may help to reduce contention by restricting access to the medium only to a subset of the wireless devices. The grouping may also reduce the signalling overhead.

As described above, the BSS may be represented by the access node and one or more terminal devices connected to the access node. In the example of FIG. 1, the access node 100 and the terminal device 102 may be comprised in a first BSS and the access node 106 and the terminal device 104 may be comprised in a second BSS. The first BSS and the second BSS may be overlapping BSSs in the sense that at least some of the devices first BSS are capable of receiving frames from the second BSS and vice versa. A terminal device may establish a connection with any one of the access nodes it has detected to provide a wireless connection within the neighbourhood of the terminal device. In the example of FIG. 1, the terminal device 102 is located within the coverage area of the access node 100 so it may establish a connection to that access node 100. Similarly, the terminal device 104 may establish a connection to the access node 106. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

Wireless devices may be configured to carry out measurements in order to detect new access nodes and/or to measure overlapping wireless networks and their wireless devices. The measurements may be carried out with a purpose of making an association to a new access node or reporting the presence or parameters of neighbouring wireless networks to an access node currently associated to a terminal device. The terminal device may carry out the measurements by scanning for signals transmitted by wireless devices of other wireless networks, e.g. wireless devices that do not belong to the wireless network of the terminal device. Upon detecting a signal transmitted by such a wireless device, the terminal device may report the detected wireless device to the associated access node. Alternatively, the terminal device may perform active scanning in which the terminal device scans actively for the presence of access networks and/or services provided by the access networks. The terminal device may carry out the active scanning by transmitting a scanning request message addressed to a determined destination, e.g. a defined access network or a network entity. Examples of the scanning request messages include a probe request and a generic advertisement service (GAS) request. The probe request may be used to determine which access nodes and corresponding access networks are within range. The GAS provides for Layer 2 transport of an advertisement protocol frames between the terminal device and a server connected to the access nodes. The GAS requests and corresponding GAS responses may be transferred before the terminal device is authenticated to an access node. The access node may forward the GAS requests to the server the server's GAS responses back to the terminal device. The server may be considered as an access network configurator apparatuses controlling operational parameters of the access networks of at least the access nodes 100, 106.

In a conventional 802.11 network, a wireless apparatus initiating a TXOP may transmit a frame that triggers a network allocation vector (NAV). The frame may be a management frame such as a request-to-send (RTS) frame or a data frame. The frame may comprise a Duration field defining the duration of the NAV. Any other wireless apparatus detecting the frame and extracting the Duration field suspends access to the same channel for the duration of the NAV. This mechanism reduces collisions. The 802.11 networks may employ another collision avoidance mechanism called clear-channel assessment (CCA). A wireless apparatus trying to access the channel scans for the channel before the access. If the channel is sensed to contain radio energy that exceeds a CCA threshold, the wireless apparatus refrains from access the channel. If the channel is sensed to be free and no NAV is currently valid, the wireless apparatus may access the channel. A preliminary handshake preceding the TXOP by using the RTS message further reduces the collisions. The transmission of the RTS frame triggers the NAV for the duration of the RTS frame and a response frame that responds to the RTS frame, e.g. a clear-to-send (CTS) frame. With the RTS-CTS handshake, the channel is cleared from other channel accesses and the TXOP may be started after the reception of the response to the RTS with a reduced risk for collisions.

A problem in the conventional channel reservation is that the NAV silences every wireless apparatus detecting the frame that triggers the NAV, although some of the silenced wireless apparatuses could carry out frame transmissions without causing collisions or without causing collisions that would not cause too high interference towards a transmitter-receiver pair owning the TXOP. In some situations, an overlapping TXOP would be reasonable in order to improve the capacity of the wireless networks. In other situations, an overlapping TXOP would cause a collision with the pending TXOP and the overlapping TXOP should be avoided. Some embodiments of the invention provide a solution for determining when to initiate the overlapping TXOP.

Figure 2:
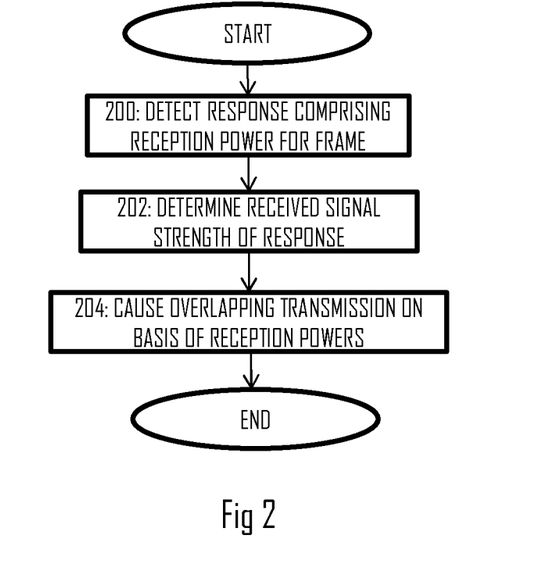
FIG. 2 illustrates a flow diagram of a process for carrying out interference-controlled transmission according to an embodiment of the invention.

FIG. 2 illustrates an embodiment of a process for determining when to initiate the overlapping TXOP. The process may be carried out in a wireless apparatus, e.g. the wireless apparatus 104 and/or 106. In an embodiment, the process may be carried out in a processor or a chipset suitable for the wireless apparatus 104, 106. Referring to FIG. 2, the process comprises detecting (block 200) a response to a frame. The response may be transmitted from a first device and it may comprise a first value indicating a received signal strength of the frame. The response may be addressed to a second device different from the apparatus carrying out the process of FIG. 2. In some embodiments, the frame detected in block 200 may even be a response to a request-to-send (RTS) frame or it may be another frame such as, for instance, a block acknowledgement (ACK) frame responding to a data frame. In block 202, a second value indicating a received signal strength of the response in the apparatus carrying out the process is measured. In block 204, the apparatus causes transmission of a frame that overlaps with a transmission between the first device and the second device only if the second value in proportion to the first value is below a determined threshold.

The received signal strength may be represented by a received signal strength indicator (RSSI) or a received channel power indicator (RCPI). The received signal strength may be indicated by an unsigned integer in units of 1 decibel (dB). The received signal strength between the first device and the second device may be computed by using equation −90 dBm+the first value.

Referring to FIG. 1, let us assume that the wireless apparatus 106 carried out the process of FIG. 2 and that the terminal device 102 is the second device and the AP 100 is the first device. The terminal device 102 transmits the RTS frame 110 to the AP 100 in order to prepare for a TXOP. The AP 100 may measure the received signal strength of the received RTS frame 110 and insert the first value representing the measured received signal strength to a CTS frame 112 transmitted to the terminal device 102. The apparatus 106 may also detect the CTS frame 112 and extract the first value from the CTS frame. As a consequence, the apparatus 106 is able to determine an interference margin of the AP 100 or a radio distance between the terminal device 102 and the AP 100 from the received signal strength. The radio distance may be considered as a measure of signal attenuation in a radio channel between the terminal device 102 and the AP 100 or, in general, between two wireless apparatuses. The apparatus 106 may then measure the received signal strength of the detected CTS frame 112 and, accordingly, determine the second value that represents the radio distance between the AP 100 and the apparatus 106. Now that the apparatus 106 has comparable information on the radio distance between the apparatuses 100, 102 and between the apparatuses 100, 106, it is able to determine whether or not it is able to start an overlapping TXOP without causing a collision that would result in a packet loss between the apparatuses 100, 102. The threshold is selected to represent minimum requirements for allowing the overlapping TXOP. The threshold may be understood to determine a minimum radio distance between the apparatus 106 and the AP 100 with respect to a radio distance between the AP 100 and the terminal device 102 for enabling the overlapping transmissions. In an example, the radio distance between the apparatuses 100, 106 should be greater than the radio distance between the apparatuses 100, 102 by a certain interference margin defined by the threshold.

Figure 3:
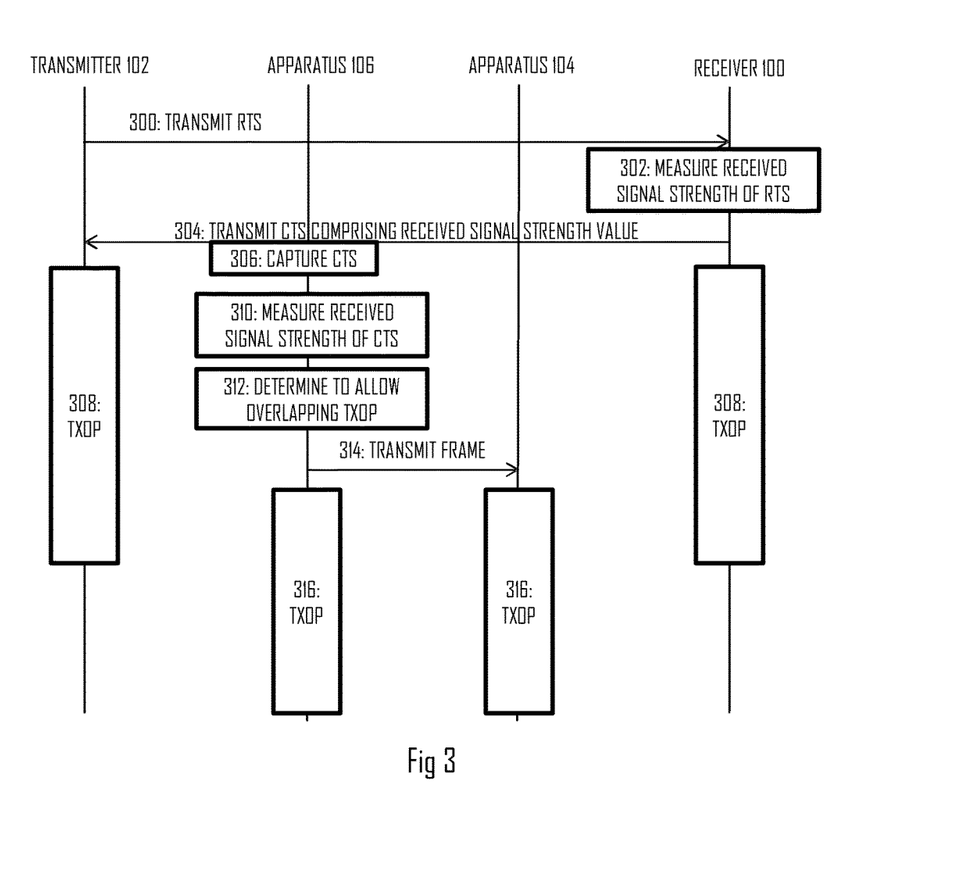
FIGS. 3 to 5 illustrate signalling diagrams of embodiments for managing overlapping transmissions in the wireless communication scenario of FIG. 1.
Figure 4:
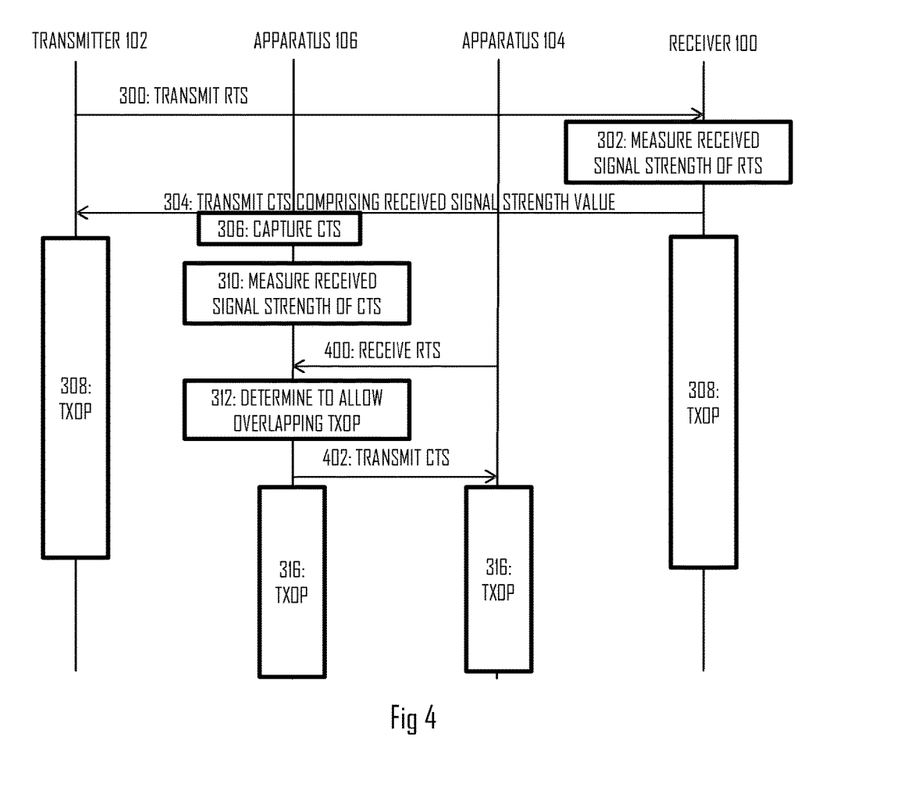
Figure 5:
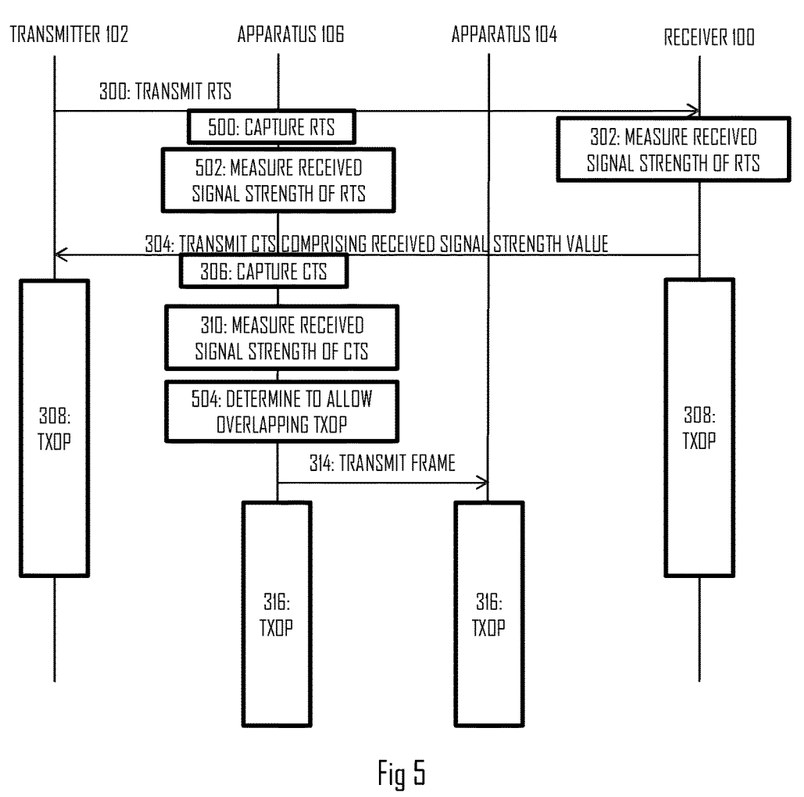

Let us now describe some embodiments of the invention with reference to signaling diagrams in FIGS. 3 to 5. The signaling diagrams illustrate operations performed in the wireless communication scenario of FIG. 1. Referring to FIG. 3, the terminal device 102 is denoted as a transmitter 102 and the AP 100 is denoted by a receiver 100 in FIG. 3. In step 300, the transmitter 102 transmits the RTS frame to the receiver 100 in order to prepare for the TXOP and clear the channel of colliding channel accesses. The receiver 100 receives the RTS frame and measures a received signal strength of the received RTS frame in block 302.

In step 304, the receiver 100 transmits a CTS frame as a response to the RTS to the transmitter 102 and inserts the first value representing the measured received signal strength into the CTS message. Then, the TXOP may be initiated between the transmitter 102 and the receiver 100 in blocks 308. Data frames may be transmitted at least from the transmitter 102 to the receiver 100 during the TXOP 308.

The apparatus 106 captures the CTS message in block 306 and extracts the first value from the CTS message. The apparatus 106 may store the first value in a database storing detected transmitter-receiver pairs and one or more received signal strength values for each pair. The database may further store received signal strength values observed by the apparatus 106 towards any other apparatus, e.g. the apparatuses 100, 102, 104. In an embodiment, the database may have a following structure:

TABLE 1

| TX-RX pair | RCPI | | |
|---|---|---|---|
| | G (TX:RX) | G (Own:TX) | G (Own:RX) |
| TX1-RX1 | −40 | −30 | −60 |
| TX2-RX2 | −30 | −60 | −30 |

In Table 1, each row stores the received signal strength between the observed transmitter-receiver pair (G(TX:RX)), the received signal strength between the apparatus storing the database and the transmitter of the transmitter-receiver pair (G(Own:TX)), and the received signal strength between the apparatus storing the database and the receiver (G(Own: RX)).

In block 312, the apparatus 106 determines whether or not to allow the overlapping TXOP. The execution of block 312 may be triggered by the apparatus 106 detecting availability of data for transmission in its transmission buffer. The decision may be based on at least the observed received signal strength between the transmitter 102 and the receiver 100 and the measured signal strength of the apparatus 106 towards at least one of the transmitter 102 and the receiver 100. Upon determining to allow the overlapping TXOP, the apparatus may cause transmission of a frame to the apparatus 104 in step 314 and initiate the overlapping TXOP 316 during which data frames may be transmitted between the apparatuses. At least some of the data frames may be transmitted simultaneously by using communication resources that overlap with communication resources of the TXOP 308. The communication resources may comprise the same frequency channel and overlapping transmission timing.

Upon determining not to allow the overlapping TXOP 316, the apparatus 106 may refrain from transmitting the frame in step 314.

In an embodiment, the frame transmitted in step 314 is a management or a control frame. In an embodiment, the frame is a RTS frame. In an embodiment, the frame is a data frame.

In an embodiment, the frame transmitted by the transmitter 102 and received by the receiver 100 in step 300 may be a data frame and the frame transmitted by the receiver 100 and received by the transmitter in step 304 may be an acknowledgment (ACK) to the data frame.

In the embodiment of FIG. 3, the apparatus initiated the overlapping TXOP on its own volition. In the embodiment of FIG. 4, the apparatus 106 receives a request for initiating the TXOP transmitted by the apparatus 104 in step 400. Until that point, the procedure may have been carried out in the above-described manner. The apparatus may have acquired the needed received signal strength values before step 400 or it may compute at least some of them upon receiving the request in step 400. Upon receiving the request addressed to the apparatus 106 in step 400, the apparatus 106 may determine that the TXOP 308 is currently active, e.g. by checking the pending NAVs, and determine whether or not to allow the overlapping TXOP 316 by evaluating the received signal strength values in the above-described manner. Upon determining that the overlapping TXOP 316 is allowable without causing too much interference towards the transmitter 102 and/or the receiver 100, the apparatus 106 may cause transmission of a response to the request in step 402. The response may comprise an indication that the request TXOP 316 is allowable. As a consequence, the overlapping TXOP may be started or continued. In an embodiment, the frame transmitted by the apparatus 104 and received by the apparatus 106 in step 400 is the RTS frame and the frame transmitted by the apparatus 106 and received by the apparatus 104 in step 402 is a CTS frame. In such an embodiment, the TXOP may be started when the apparatus 104 has received the CTS frame in step 402. As the CTS frame transferred in step 304, the CTS transferred in step 402 may comprise the received signal strength between the apparatuses 104, 106. The apparatus 106 may measure the received signal strength of the RTS received in step 400 and insert the measurement value to the CTS message 402. Accordingly, the other apparatuses, e.g. the transmitter 102 and/or the receiver 100 may determine the radio distance between the apparatuses 104, 106 and make their own decisions about the future overlapping TXOPs.

In another embodiment, the frame transferred in step 400 is a data frame. Accordingly, upon determining that the overlapping TXOP is allowable, the apparatus 106 may transmit an acknowledgment message in step 402, thus indicating that the overlapping TXOP 316 is allowable, and the overlapping TXOP 316 may be continued.

The apparatus 104 may have already carried out block 312 before transmitting the frame in step 400 and determined that the overlapping TXOP 316 is allowable from its perspective. The apparatus 106 also executing the block 312 may carry out the same procedure from its perspective. Accordingly, the apparatuses may carry out in cooperation the decision of whether or not to allow the overlapping TXOP 316. The transmitter 102 and the receiver 100 may determine the initiation of the TXOPs in the same manner. As a result, a distributed channel access principle is realized where individual wireless apparatuses make the decisions of whether or not the overlapping TXOP 106 is allowable from the interference point of view. All apparatuses may employ the same rules for the overlapping TXOPs. Upon detecting no pending TXOP, the procedure may naturally be carried out without the evaluation of the received signal strength values of the pending TXOPs.

In the embodiments of FIGS. 3 and 4, the apparatus 106 may consider only the received signal strength of the frame received from the receiver 100 in comparison with the received signal strength value comprised in the frame. A reason may be that the receiver 100 mainly receives the data frames during the TXOP and is thus more susceptible to the interference than the transmitter. The receiver 100 may send at least acknowledgment frames back to the transmitter 102 but the acknowledgment frames are typically highly protected against interference, e.g. by using stronger channel coding and/or parity check bits. In the embodiment of FIG. 5, the apparatus 106 may additionally, or alternatively, consider the received signal strength of a frame received from the transmitter 102. This may be carried out to ensure that the overlapping TXOP 316 will not degrade the performance of the transmitter 102, e.g. reception of the acknowledgment messages from the receiver 100.

Referring to FIG. 5, the apparatus 106 may capture the RTS frame transferred in step 300 (block 500). In block 502, the apparatus 502 may measure the received signal strength of the captured RTS frame and store the measurement value to the database. Steps 304, 306, and 310 may be carried out in the above-described manner. In block 504, the apparatus 106 may evaluate the received signal strength value towards the transmitter 102 and the received signal strength value towards the receiver 100 when determining the initiation of the overlapping TXOP. The received signal strength value towards the transmitter 102 and the received signal strength value towards the receiver 100 may be compared with the same threshold or a different threshold. In an embodiment using the different thresholds, stricter requirements may be used when evaluating the received signal strength value towards the receiver 100 than towards the transmitter 102. For example, a minimum radio distance towards the receiver 100 to allow the overlapping TXOP may be higher than the corresponding minimum radio distance towards the transmitter 102, thus ensuring better interference protection towards the receiver 100.

The embodiment of FIG. 5 is described in the context of FIG. 3 where the apparatus initiates the overlapping TXOP 316 but it is equally applicable to the embodiment of FIG. 4 in a straightforward manner.

Figure 6:
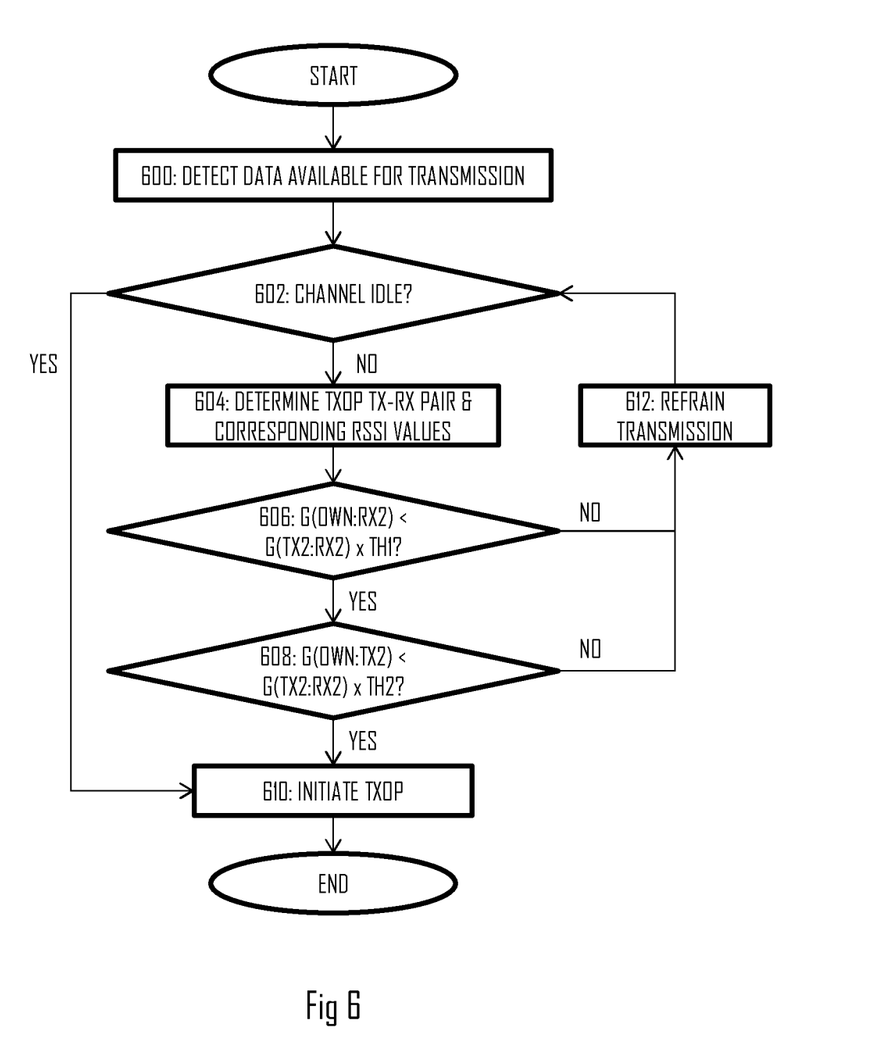
FIGS. 6 and 7 illustrate embodiments for managing overlapping transmission opportunities from a perspective of a transmitter and a receiver, respectively.
Figure 7:
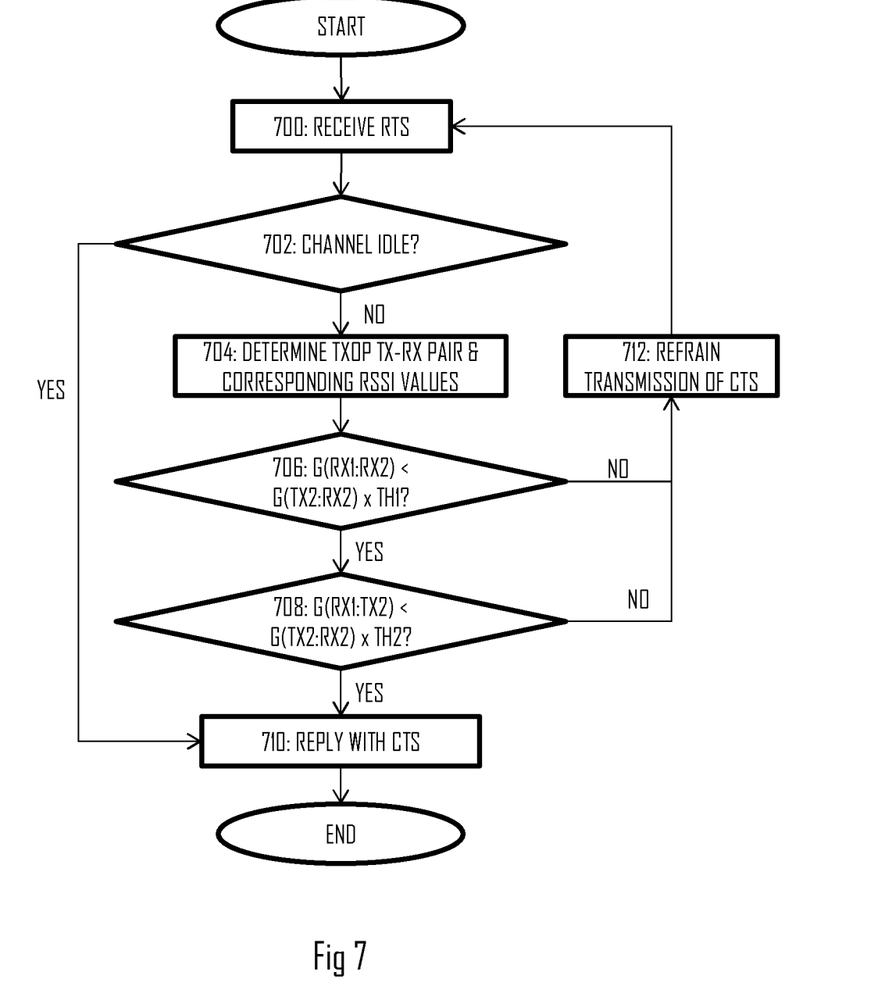

Let us now describe the operation of the decision-making when initiating the overlapping TXOP in greater detail with reference to FIGS. 6 and 7. FIG. 6 illustrates a flow diagram of the process from the perspective of an apparatus having data to be transmitted, e.g. the transmitter 102, the apparatus 106 in FIGS. 3 and 5, and the apparatus 104 in FIG. 4. Referring to FIG. 6, the apparatus detects in block 600 that it has data available for transmission. In block 602, the apparatus senses the channel, e.g. through the CCA procedure and/or by checking the pending NAVs. If the channel is sensed to be idle, the process proceeds to block 610 in which the apparatus initiates the TXOP. If the channel is sensed to be occupied, e.g. by detecting a pending TXOP, the apparatus may carry out the interference control procedure according to an embodiment of the invention before initiating the overlapping TXOP. Then, the process may proceed to block 604 in which the apparatus may determine the transmitter and the receiver of the pending TXOP and corresponding received signal strength values. The received signal strength values may be retrieved from the database upon determining the transmitter-receiver pair. The apparatus may retrieve the received signal strength value representing the link between the transmitter-receiver pair, e.g. G(TX2:RX2), the received signal strength value representing the link between the apparatus and the transmitter, e.g. G(OWN:TX2), and the received signal strength value representing the link between the apparatus and the receiver, e.g. G(OWN:RX2). The apparatus may also retrieve one or more threshold values used in the process.

In block 606, the apparatus compares the received signal strength value representing the link between the apparatus and the receiver in proportion to the received signal strength value representing the link between the transmitter-receiver pair with a first threshold TH1. The comparison may be based on checking whether or not requirement G(OWN: RX2)<G(TX2:RX2)*TH1 is satisfied. If the requirement is satisfied, the apparatus may determine that it is sufficiently far away from the receiver RX2 such that the overlapping TXOP is allowable in that respect. As a consequence, the process may proceed to block 608. If the requirement is not satisfied, the process may proceed to block 612 in which the apparatus refrains from initiating the overlapping TXOP. Then, the process may return to block 602, for example, after a determined backoff delay.

In block 608, the apparatus compares the received signal strength value representing the link between the apparatus and the transmitter in proportion to the received signal strength value representing the link between the transmitter-receiver pair with a second threshold TH2. The comparison may be based on checking whether or not requirement $G(OWN:TX2)<G(TX2:RX2)*TH2$ is satisfied. If the requirement is satisfied, the apparatus may determine that it is sufficiently far away from the transmitter TX2 such that the overlapping TXOP is allowable in that respect. As a consequence, the process may proceed to block 610. If the requirement is not satisfied, the process may proceed to block 612.

As described above, the thresholds TH1 and TH2 may be the same or different thresholds. In an embodiment where it is considered that the receiver RX2 is a receiver of data packets and the transmitter TX2 is a receiver of acknowledgment frames, the first threshold TH1 may be a threshold for data frames and the second threshold TH2 may be a threshold for control frames. In an embodiment, the first threshold TH1 is smaller than the second threshold TH2, thus providing better interference protection for the receiver RX2 of the data packets than for the receiver TX2 of the acknowledgment messages. In an embodiment, the TH1 may be 0.01 and TH2 may be 0.1.

In an embodiment of FIG. 6, the apparatus carrying out the process may also take into account that the pending TXOP comprises transmission of data frames to both directions. As a consequence, the apparatus may employ the stricter threshold TH1 in both 606 and 608.

FIG. 7 illustrates a flow diagram of the process from the perspective of an apparatus receiving a request for establishing the TXOP, e.g. the receiver 100, the apparatus 106 in FIG. 4, and the apparatus 104 in FIGS. 3 and 5. From the point of view of the receiver, the transmission opportunity TXOP may be considered as a reception opportunity RXOP but let us refer to the TXOP for the sake of simplicity. Referring to FIG. 7, the apparatus receives in block 700 an RTS frame, a data frame, or another frame from another apparatus requesting for the establishment of the TXOP. For example, the frame may be received as a result of the other apparatus executing the block 610 of FIG. 6. Upon receiving the frame in block 700, the apparatus may sense the channel in block 702 in order to determine whether or not pending TXOPs are detected. Block 702 may be substantially similar to block 602. If the channel is sensed to be free, the process may proceed to block 710 in which the apparatus responds to the frame received in block 700, e.g. by transmitting a CTS frame.

If the channel is sensed to be occupied, e.g. by detecting a pending TXOP, the apparatus may carry out the interference control procedure according to an embodiment of the invention before initiating the overlapping TXOP. Then, the process may proceed to block 704 in which the apparatus may determine the transmitter and the receiver of the pending TXOP and corresponding received signal strength values. The received signal strength values may be retrieved from the database upon determining the transmitter-receiver pair. The apparatus may retrieve the received signal strength value representing the link between the transmitter-receiver pair, e.g. $G(TX2:RX2)$, the received signal strength value representing the link between the apparatus and the transmitter, e.g. $G(OWN:TX2)$, and the received signal strength value representing the link between the apparatus and the receiver, e.g. $G(OWN:RX2)$. The apparatus may also retrieve one or more threshold values used in the process.

In block 706, the apparatus compares the received signal strength value representing the link between the apparatus and the receiver RX2 in proportion to the received signal strength value representing the link between the transmitter-receiver pair with a first threshold TH1. The comparison may be based on checking whether or not requirement $G(OWN:RX2)<G(TX2:RX2)*TH1$ is satisfied. If the requirement is satisfied, the apparatus may determine that it is sufficiently far away from the receiver RX2 such that the overlapping TXOP is allowable in that respect. As a consequence, the process may proceed to block 708. If the requirement is not satisfied, the process may proceed to block 712 in which the apparatus refrains from responding to the frame received in block 700 and starting the overlapping TXOP. Then, the process may return to block 700 when the apparatus receives another frame, or to block 600 when the apparatus has data to be transmitted.

In block 708, the apparatus compares the received signal strength value representing the link between the apparatus and the transmitter in proportion to the received signal strength value representing the link between the transmitter-receiver pair with a second threshold TH2. The comparison may be based on checking whether or not requirement $G(OWN:TX2)<G(TX2:RX2)*TH2$ is satisfied. If the requirement is satisfied, the apparatus may determine that it is sufficiently far away from the transmitter TX2 such that the overlapping TXOP is allowable in that respect. As a consequence, the process may proceed to block 710. If the requirement is not satisfied, the process may proceed to block 712.

As described in connection with FIG. 6, TH1 and TH2 may be the same threshold or different thresholds.

In the context of detecting multiple pending TXOPs in block 602 or 702, the same process may be carried out for the plurality of detected pending TXOPs in order to determine whether or not the overlapping TXOP causes too much interference to any one of the pending TXOPs. Upon determining that all the pending TXOPs are not interfered with the overlapping TXOP, the overlapping TXOP may be initiated. On the other hand, if any one or more of the pending TXOPs is determined to be interfered such that the performance of the pending TXOP(s) deteriorates, the establishment of the overlapping TXOP may be suspended.

When the decision about the establishment of the overlapping TXOP is made in an access node associated to a plurality of terminal devices, the access node may have multiple candidates for the TXOP. Each terminal device may experience a different radio environment and, accordingly, one terminal device may be capable of establishing the overlapping TXOP while another terminal device may be incapable of doing so. Upon a failed attempt on establishing the overlapping TXOP with one terminal device, e.g. upon not receiving the CTS to the RTS from the terminal device, the access node may attempt the establishment of the overlapping TXOP with another terminal device.

In the above-described embodiments, the decision by the apparatus of whether or not allowing the overlapping TXOP may be based on the assumption that all the apparatuses 100 to 106 use the same transmit power. In embodiments where the apparatuses use variable transmit powers, the response frame carrying the received signal strength of the transmitter-receiver pair may also contain a transmit power value used for estimating the received signal strength of the transmitter-receiver pair and, additionally or alternatively, a transmit power value representing the transmit power of the response frame. Then, the apparatus may scale the received signal strength value and the measured received signal strength value(s) by equalizing the effect of the variable transmit powers. This may be carried out by reducing a received signal strength value that has been acquired with a higher transmit power and/or by increasing a received signal strength value that has been acquired with a lower transmit power. As a result, the effect of the variable transmit powers on the received signal strength values may be eliminated in the comparison in blocks 606, 608, 706, and 708, for example.

Figure 8:
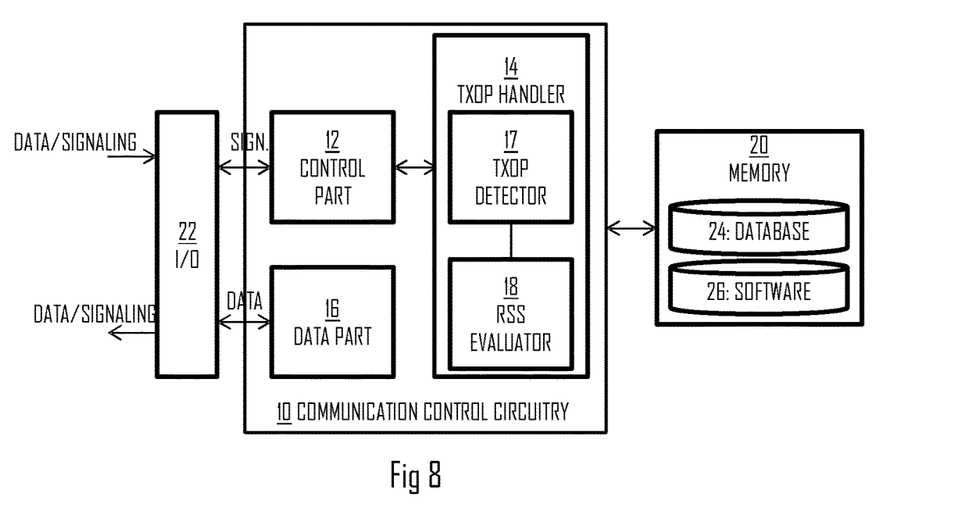
FIG. 8 is a block diagram of a structure of an apparatus according to an embodiment of the invention.

The embodiments of the invention may be applicable to situations where the transmitter-receiver pair and/or the apparatus employ(s) omnidirectional transmissions The embodiments of the invention may be applicable to situations where the transmitter-receiver pair and/or the apparatus employs directional transmissions, e.g. beamforming utilizing multiple receive and/or transmit antennas. In such embodiments, the RTS-CTS handshake may be transmitted by using the same beamforming configuration as used in the TXOPs, e.g. the same beamforming configuration in steps 300, 304, and 308. In this case, the transmission beamforming applied by apparatus 102 may be the same in steps 300 and 308. Similarly, the reception beamforming applied by apparatus 100 in step 308 may be matched to the transmit beamforming applied by apparatus 100 in step 304, e.g. by employing the same beamforming weights in the transmission and in the reception FIG. 8 illustrates an embodiment of an apparatus comprising means for carrying out the above-mentioned functionalities in the wireless apparatus. The apparatus may comply with specifications of an IEEE 802.11 network and/or another wireless network. The apparatus may be comprised in an access node or in a terminal device. The apparatus may be a cognitive radio apparatus capable of adapting its operation to a changing radio environment, e.g. to changes in parameters of another system on the same frequency band and/or changing interference scenarios. The apparatus may be or may be comprised in a computer (PC), a laptop, a tablet computer, a cellular phone, a palm computer, a base station or a fixed access point, or any other apparatus provided with radio communication capability. In another embodiment, the apparatus carrying out the above-described functionalities of the wireless apparatus is comprised in such a wireless apparatus, e.g. the apparatus may comprise a circuitry, e.g. a chip, a chipset, a processor, a micro controller, or a combination of such circuitries in the wireless apparatus.

Referring to FIG. 8, the apparatus may comprise a communication controller circuitry 10 configured to control wireless communications in the wireless apparatus. The communication controller circuitry 10 may configure the establishment, operation, and termination of connections or associations with other wireless apparatuses. The communication controller circuitry 10 may comprise a control part 12 handling control signalling communication with respect to transmission, reception, and extraction of control or management frames including request frames, response frames, scanning messages, etc. The communication controller circuitry 10 may further comprise a data part 16 that handles transmission and reception of payload data over the connections or associations established by the control part 12.

The communication control circuitry 10 may further comprise a TXOP handler circuitry 14 configured to manage establishment, operation, and termination of TXOPs in the apparatus. The TXOP handler circuitry 14 may comprise a TXOP detector circuitry 17 configured to detect pending TXOPs of other wireless apparatuses. The TXOP detector circuitry 17 may be invoked upon the TXOP handler circuitry triggering establishment of the TXOP, e.g. upon detecting data available for transmission and/or upon receiving a TXOP initialization frame through the control part 12 or data part 16. The TXOP initialization frame may comprise an RTS frame or a data frame. Upon being invoked, the TXOP detector may determine whether or not pending TSOPs have been detected (block 602 or 702). Upon detecting a pending TXOP, the TXOP detector circuitry 17 may output a control signal to a received signal strength (RSS) evaluator circuitry 18 configured to determine whether or not the overlapping TXOP may be established. The operation of the RSS evaluator circuitry may follow the principles described above in connection with FIG. 2, 6, or 7, for example. The RSS evaluator circuitry may employ a database 24 storing the values representing radio distances between the apparatus and pending TXOP owners and at least one radio distance between the pending TXOP owners (see Table 1). Upon determining that the overlapping TXOP may be established, the RSS evaluator circuitry 18 may output a control signal causing the control part 12 to establish the TXOP. Otherwise, the RSS evaluator circuitry 18 may output a control signal that causes the suspension of the TXOP establishment.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) 26 configuring the apparatus to perform the above-described functionalities of the wireless apparatus. The memory 20 may also store communication parameters and other information needed for the wireless communications, e.g. the database 24. The apparatus may further comprise radio interface components 22 providing the apparatus with radio communication capabilities within one or more wireless networks. The radio interface components 22 may comprise standard well-known components such as an amplifier, filter, frequency-converter, (de)modulator, and encoder/decoder circuitries and one or more antennas. The apparatus may further comprise a second input/output interface (not shown) that provides a connection to the access network controller apparatus and the Internet, for example. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the access node comprises at least one processor 10 and at least one memory 20 including a computer program code, wherein the at least one memory and the computer program code are configured, with the at least one processor, to cause the apparatus to carry out the functionalities of any one of the wireless apparatuses 100 to 106 according to any one of the embodiments of FIGS. 2 to 7. Accordingly, the at least one processor, the memory, and the computer program code form processing means for carrying out embodiments of the present invention in the apparatus.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

An embodiment of the invention provides a method comprising: detecting, by an apparatus, a response to a frame, the response transmitted from a first device as addressed to a second device different from the apparatus and comprising a first value indicating a received signal strength between the first device and the second device; determining, by the apparatus, a second value indicating a received signal strength of the response in the apparatus; and causing, by the apparatus, transmission of a frame that overlaps with a transmission between the first device and the second device only if the second value in proportion to the first value is below a determined threshold.

In an embodiment, the frame is a request-to-send frame and the response is a clear-to-send frame, or wherein the frame is a data frame and the response is an acknowledgment frame.

In an embodiment, the threshold determines a minimum radio distance between the apparatus and the first device with respect to a radio distance between the first device and the second device for enabling the overlapping transmissions.

In an embodiment, the overlapping frame is a management frame.

In an embodiment, the overlapping frame is at least one of a request-to-send frame and a response to the request-to-send frame.

In an embodiment, the method further comprises detecting the frame transmitted from the second device; determining a third value representing the received signal strength of the frame; and causing transmission of the overlapping frame only if the third value in proportion to the first value is below a determined second threshold.

In an embodiment, the second threshold determines a minimum radio distance between the apparatus and the second device with respect to a radio distance between the first device and the second device for enabling the overlapping transmissions.

In an embodiment, the method further comprises using, by the apparatus, different thresholds when determining to cause transmission of a management frame and when determining to cause transmission of a data frame. In an embodiment, a threshold associated with the transmission of the management frame is higher than a threshold associated with the transmission of the data frame.

Another embodiment provides a method comprising: receiving, by a first apparatus, a frame from a second apparatus, wherein the frame triggers a channel reservation for the duration of transmitting the frame and a response to the frame; determining a received signal strength of the frame in the first apparatus; and causing, by the first apparatus, transmission of the response to the frame within said duration, the response comprising a first value indicating the determined received signal strength.

In an embodiment, the frame is a request-to-send frame and the response is a clear-to-send frame, or wherein the frame is a data frame and the response is an acknowledgment frame.

Another embodiment provides an apparatus comprising: at least one processor; and at least one memory including a computer program code, wherein the at least one memory and the computer program code are configured, with the at least one processor, to cause the apparatus to: detect a response to a frame, the response addressed from a first device to a second device different from the apparatus and comprising a first value indicating a received signal strength between the first device and the second device; determine a second value indicating a received signal strength of the response in the apparatus; and cause transmission of a frame that overlaps with a transmission between the first device and the second device only if the second value in proportion to the first value is below a determined threshold.

In an embodiment, the frame is a request-to-send frame and the response is a clear-to-send frame, or wherein the frame is a data frame and the response is an acknowledgment frame.

In an embodiment, the threshold determines a minimum radio distance between the apparatus and the first device with respect to a radio distance between the first device and the second device for enabling the overlapping transmissions.

In an embodiment, the overlapping frame is a management frame.

In an embodiment, the overlapping frame is at least one of a request-to-send frame and a response to the request-to-send frame.

In an embodiment, the at least one memory and the computer program code are configured, with the at least one processor, to cause the apparatus to: detect the frame transmitted from the second device; determine a third value representing the received signal strength of the frame; and cause transmission of the overlapping frame only if the third value in proportion to the first value is below a determined second threshold. In an embodiment, the second threshold determines a minimum radio distance between the apparatus and the second device with respect to a radio distance between the first device and the second device for enabling the overlapping transmissions.

In an embodiment, the at least one memory and the computer program code are configured, with the at least one processor, to cause the apparatus to use different thresholds when determining to cause transmission of a management frame and when determining to cause transmission of a data frame.

Another embodiment provides an apparatus comprising: at least one processor; and at least one memory including a computer program code, wherein the at least one memory and the computer program code are configured, with the at least one processor, to cause the apparatus to: detect a frame from a second apparatus, wherein the frame triggers a channel reservation for the duration of transmitting the frame and a response to the frame; determine a received signal strength of the frame in the apparatus; and cause transmission of the response to the frame within said duration, the response comprising a first value indicating the determined received signal strength.

In an embodiment, the frame is a request-to-send frame and the response is a clear-to-send frame, or wherein the frame is a data frame and the response is an acknowledgment frame.

Another embodiment provides a wireless communication system comprising: a first apparatus comprising at least one processor and at least one memory including a computer program code, wherein the at least one memory and the computer program code are configured, with the at least one processor, to cause the first apparatus to: detect a frame from a second apparatus, wherein the frame triggers a channel reservation for the duration of transmitting the frame and a response to the frame; determine a received signal strength of the frame in the first apparatus; and cause transmission of the response to the frame within said duration, the response comprising a first value indicating the determined received signal strength; and a third apparatus comprising at least one processor and at least one memory including a computer program code, wherein the at least one memory and the computer program code are configured, with the at least one processor, to cause the third apparatus to: detect the response to the frame, the response addressed from the first apparatus to the second apparatus different from the third apparatus and comprising the first value indicating the received signal strength between the first apparatus and the second apparatus; determine a second value indicating a received signal strength of the response in the third apparatus; and cause transmission of a frame that overlaps with a transmission between the first apparatus and the second apparatus only if the second value in proportion to the first value is below a determined threshold.

The present invention is applicable to wireless networks defined above but also to other suitable communication systems. The protocols used, the specifications of wireless networks, their network elements and terminal devices, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    detecting, by an apparatus, a response to a frame, the response transmitted from a first device as addressed to a second device different from the apparatus and comprising a first value indicating a received signal strength between the first device and the second device;
    determining, by the apparatus, a second value indicating a received signal strength of the response in the apparatus; and
    causing, by the apparatus, transmission of an overlapping frame that overlaps with a transmission between the first device and the second device based on the second value in proportion to the first value being below a determined threshold.

2. The method of claim 1, wherein the frame is a request-to-send frame and the response is a clear-to-send frame, or wherein the frame is a data frame and the response is an acknowledgment frame.

3. The method of claim 1, wherein the threshold determines a minimum radio distance between the apparatus and the first device with respect to a radio distance between the first device and the second device for enabling the overlapping transmissions.

4. The method of claim 1, wherein the overlapping frame is at least one of a request-to-send frame and a response to the request-to-send frame.

5. The method of claim 1, further comprising:
    detecting the frame transmitted from the second device;
    determining a third value representing the received signal strength of the frame; and
    causing transmission of the overlapping frame based on the third value in proportion to the first value being below a determined second threshold.

6. The method of claim 1, further comprising using, by the apparatus, different thresholds when determining to cause transmission of a management frame and when determining to cause transmission of a data frame.

7. The method of claim 6, wherein a threshold associated with the transmission of the management frame is higher than a threshold associated with the transmission of the data frame.

8. A method comprising:
    receiving, by a first apparatus, a frame from a second apparatus, wherein the frame triggers a channel reservation for a duration of transmitting the frame and a response to the frame;
    determining a received signal strength of the frame in the first apparatus; and
    causing, by the first apparatus, transmission of the response to the frame within said duration, the response comprising a first value indicating the determined received signal strength.

9. The method of claim 8, wherein the frame is a request-to-send frame and the response is a clear-to-send frame, or wherein the frame is a data frame and the response is an acknowledgment frame.

10. An apparatus comprising:
    at least one processor; and
    at least one memory including a computer program code, wherein the at least one memory and the computer program code are configured, with the at least one processor, to cause the apparatus to:

detect a response to a frame, the response addressed from a first device to a second device different from the apparatus and comprising a first value indicating a received signal strength between the first device and the second device;

determine a second value indicating a received signal strength of the response in the apparatus; and cause transmission of an overlapping frame that overlaps with a transmission between the first device and the second device only if the second value in proportion to the first value is below a determined threshold.

11. The apparatus of claim 10, wherein the frame is a request-to-send frame and the response is a clear-to-send frame, or wherein the frame is a data frame and the response is an acknowledgment frame.

12. The apparatus of claim 10, wherein the threshold determines a minimum radio distance between the apparatus and the first device with respect to a radio distance between the first device and the second device for enabling the overlapping transmissions.

13. The apparatus of claim 10, wherein the overlapping frame is a management frame.

14. The apparatus of claim 13, wherein the overlapping frame is at least one of a request-to-send frame and a response to the request-to-send frame.

15. The apparatus of claim 10, wherein the at least one memory and the computer program code are configured, with the at least one processor, to cause the apparatus to:

detect the frame transmitted from the second device;

determine a third value representing the received signal strength of the frame; and cause transmission of the overlapping frame only if the third value in proportion to the first value is below a determined second threshold.

16. The apparatus of claim 15, wherein the second threshold determines a minimum radio distance between the apparatus and the second device with respect to a radio distance between the first device and the second device for enabling the overlapping transmissions.

17. The apparatus of claim 10, wherein the at least one memory and the computer program code are configured, with the at least one processor, to cause the apparatus to use different thresholds when determining to cause transmission of a management frame and when determining to cause transmission of a data frame.

18. An apparatus comprising:
at least one processor; and
at least one memory including a computer program code, wherein the at least one memory and the computer program code are configured, with the at least one processor, to cause the apparatus to:

detect a frame from a second apparatus, wherein the frame triggers a channel reservation for a duration of transmitting the frame and a response to the frame;

determine a received signal strength of the frame in the apparatus; and cause transmission of the response to the frame within said duration, the response comprising a first value indicating the determined received signal strength.

19. The apparatus of claim 18, wherein the frame is a request-to-send frame and the response is a clear-to-send frame, or wherein the frame is a data frame and the response is an acknowledgment frame.

20. A wireless communication system comprising:

a first apparatus comprising at least one processor and at least one memory including a computer program code, wherein the at least one memory and the computer program code are configured, with the at least one processor, to cause the first apparatus to: detect a frame from a second apparatus, wherein the frame triggers a channel reservation for a duration of transmitting the frame and a response to the frame; determine a received signal strength of the frame in the first apparatus; and cause transmission of the response to the frame within said duration, the response comprising a first value indicating the determined received signal strength; and a third apparatus comprising at least one processor and at least one memory including a computer program code, wherein the at least one memory and the computer program code are configured, with the at least one processor, to cause the third apparatus to: detect the response to the frame, the response addressed from the first apparatus to the second apparatus different from the third apparatus and comprising the first value indicating the received signal strength between the first apparatus and the second apparatus; determine a second value indicating a received signal strength of the response in the third apparatus; and cause transmission of a frame that overlaps with a transmission between the first apparatus and the second apparatus only if the second value in proportion to the first value is below a determined threshold.

* * * * *